(12) United States Patent
Lee et al.

(10) Patent No.: US 10,405,341 B2
(45) Date of Patent: Sep. 3, 2019

(54) METHOD FOR TRANSMITTING A CONTENTION-BASED PUSCH IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/565,857

(22) PCT Filed: May 11, 2016

(86) PCT No.: PCT/KR2016/004935
§ 371 (c)(1),
(2) Date: Oct. 11, 2017

(87) PCT Pub. No.: WO2016/182342
PCT Pub. Date: Nov. 17, 2016

(65) Prior Publication Data
US 2018/0115988 A1   Apr. 26, 2018

Related U.S. Application Data

(60) Provisional application No. 62/159,973, filed on May 12, 2015.

(51) Int. Cl.
*H04W 28/12* (2009.01)
*H04W 72/12* (2009.01)
(Continued)

(52) U.S. Cl.
CPC ......... *H04W 72/14* (2013.01); *H04L 41/0803* (2013.01); *H04W 28/0231* (2013.01);
(Continued)

(58) Field of Classification Search
None
See application file for complete search history.

(56) References Cited

U.S. PATENT DOCUMENTS

2011/0044297 A1   2/2011   Lee et al.
2011/0128928 A1*  6/2011   Lin ................... H04W 74/0833
                                                 370/329
(Continued)

OTHER PUBLICATIONS

PCT International Application No. PCT/KR2016/004935, Notification of Transmittal of the International Search Report and the Written Opinion of the International Searching Authority, or Declaration dated Aug. 8, 2016, 14 pages.

*Primary Examiner* — Edan Orgad
*Assistant Examiner* — Emmanuel K Maglo
(74) *Attorney, Agent, or Firm* — Lee, Hong, Degerman, Kang & Waimey

(57) ABSTRACT

The present invention relates to a wireless communication system. More specifically, the present invention relates to a method and a device for transmitting a contention-based PUSCH in a wireless communication system, the method comprising: configuring a CB grant; configuring a prohibit condition indicating that a data cannot be transmitted using the CB grant; receiving uplink data from an upper layer; checking whether the prohibit condition is met for the uplink data; and transmitting the uplink data using the CB grant if the prohibit condition is not met.

17 Claims, 11 Drawing Sheets

(51) Int. Cl.
*H04W 72/14* (2009.01)
*H04W 28/02* (2009.01)
*H04L 12/24* (2006.01)
*H04W 74/08* (2009.01)
*H04L 12/26* (2006.01)
*H04W 88/02* (2009.01)

(52) U.S. Cl.
CPC ....... *H04W 28/0278* (2013.01); *H04W 28/12* (2013.01); *H04W 72/1284* (2013.01); *H04L 43/16* (2013.01); *H04W 74/08* (2013.01); *H04W 74/0833* (2013.01); *H04W 88/02* (2013.01)

(56) References Cited

U.S. PATENT DOCUMENTS

| | | | |
|---|---|---|---|
| 2011/0243080 A1 | 10/2011 | Chen et al. | |
| 2011/0267959 A1* | 11/2011 | Yi | H04W 72/10 370/241 |
| 2011/0292895 A1* | 12/2011 | Wager | H04L 5/0007 370/329 |
| 2012/0044816 A1 | 2/2012 | Ratasuk et al. | |
| 2012/0201219 A1* | 8/2012 | Wager | H04L 1/1812 370/329 |
| 2012/0275381 A1* | 11/2012 | Kim | H04W 74/08 370/328 |
| 2012/0281566 A1* | 11/2012 | Pelletier | H04W 76/27 370/252 |
| 2012/0294269 A1 | 11/2012 | Yamada et al. | |
| 2013/0016689 A1* | 1/2013 | Jeong | H04W 74/02 370/329 |
| 2013/0028204 A1* | 1/2013 | Dinan | H04W 72/042 370/329 |
| 2013/0107781 A1* | 5/2013 | Lu | H04L 1/188 370/311 |
| 2014/0321391 A1 | 10/2014 | Zhang et al. | |

\* cited by examiner

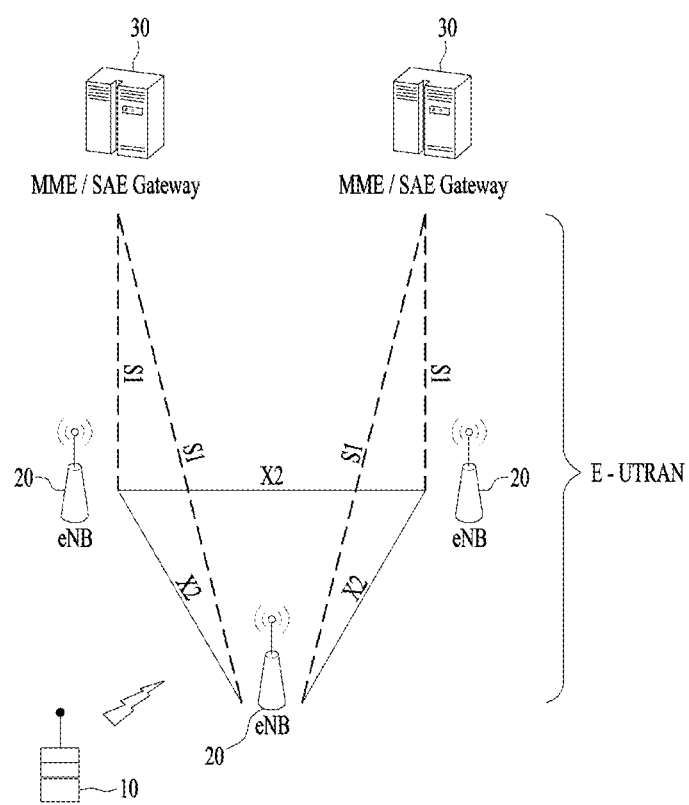

(a) Control-Plane Protocol Stack (b) User-Plane Protocol Stack

METHOD FOR TRANSMITTING A CONTENTION-BASED PUSCH IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2016/004935, filed on May 11, 2016, which claims the benefit of U.S. Provisional Application No. 62/159,973, filed on May 12, 2015, the contents of which are all hereby incorporated by reference herein in their entirety.

TECHNICAL FIELD

The present invention relates to a wireless communication system and, more particularly, to a method for transmitting a contention-based PUSCH in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting a contention-based PUSCH in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

The invention is that when there is data available for transmission for a logical channel, the UE can transmit the data of the logical channel on either CB-PUSCH or uplink grant if a prohibit condition is not met. If the prohibit condition is met, the UE transmits the data of the logical channel only on the uplink grant even though there is the CB-PUSCH.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2A is a block diagram illustrating network structure of an evolved universal mobile telecommunication system (E-UMTS)

BEST MODE

Figure 1:
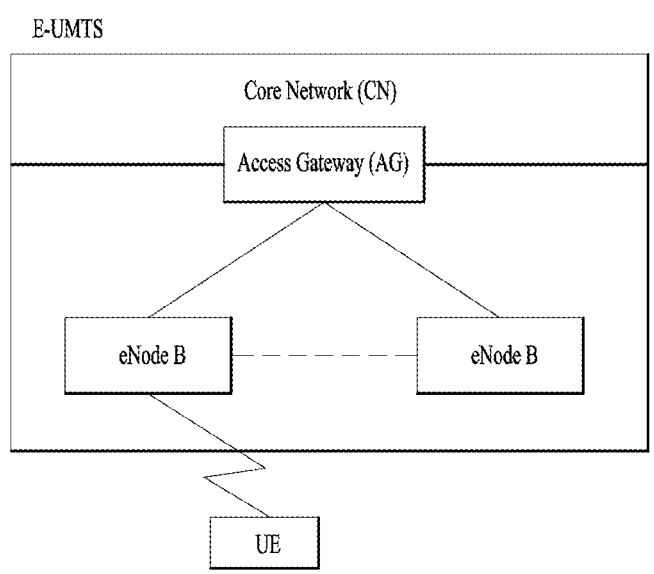
FIG. 1 is a diagram showing a network structure of an Evolved Universal Mobile Telecommunications System (E-UMTS) as an example of a wireless communication system.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
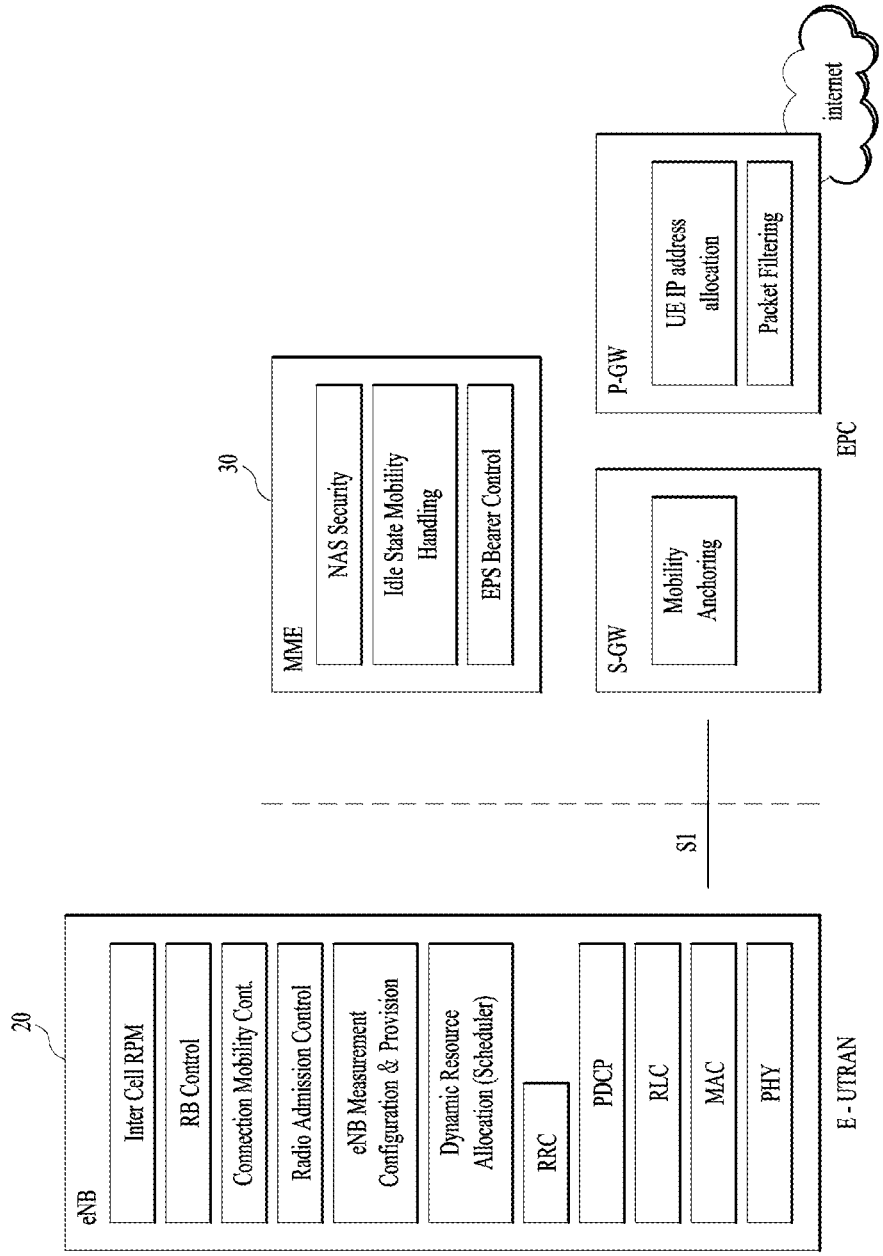
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
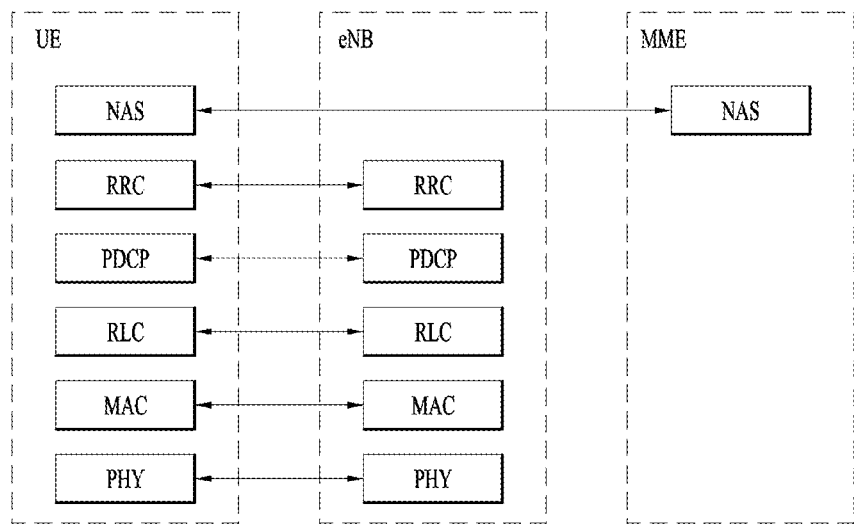
FIG. 3 is a diagram showing a control plane and a user plane of a radio interface protocol between a UE and an E-UTRAN based on a 3rd generation partnership project (3GPP) radio access network standard.
Figure 3:
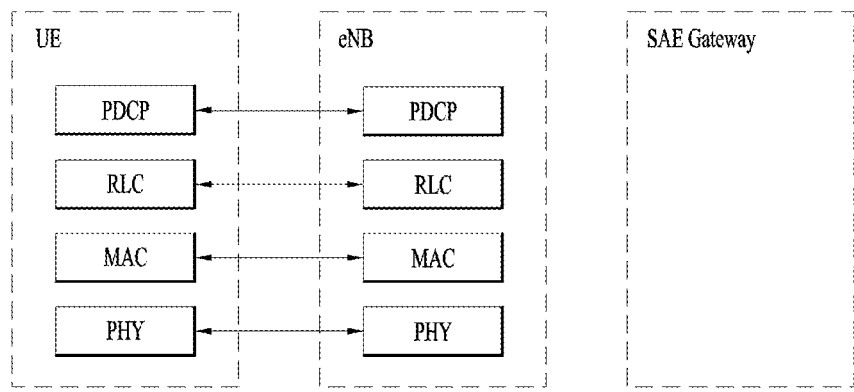

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
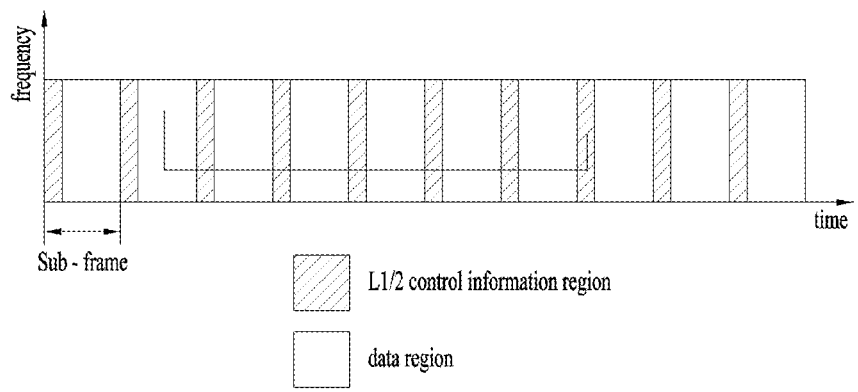
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
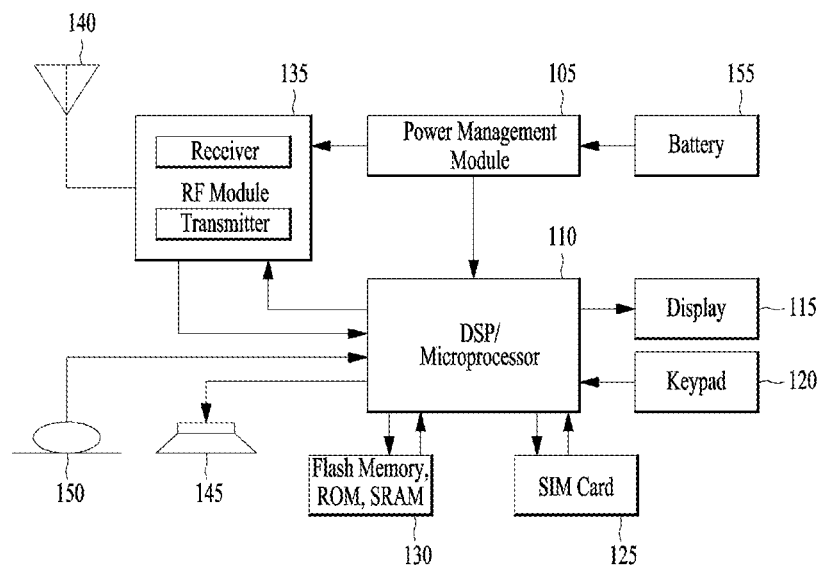
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
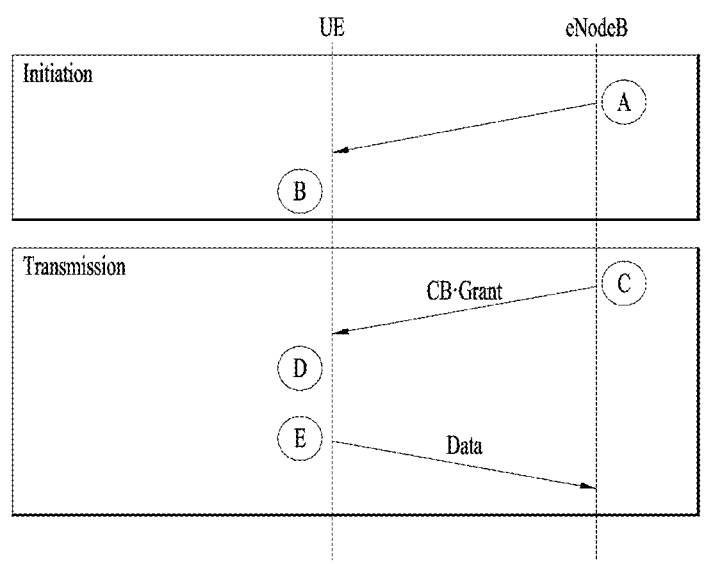
FIG. 6 is an example for a diagram for performing contention based transmission.

FIG. 6 is an example for a diagram for performing contention based transmission.

One simple but efficient method for latency reduction for typical internet traffic in an unloaded or partially-loaded network is Pre-allocation. Pre-allocation is a form of pre-scheduling that provides the UE with an opportunity to send UL packets without requiring the UE to send a scheduling request. The scheduling request procedure when in-sync takes 10 ms, and this makes it impossible for LTE to support the original RAN latency requirement of 10 ms round trip (2×5 ms one way) delay defined in the original LTE requirement specification 25.913 unless UL resources are pre-scheduled for the terminal.

Pre-allocation provides resource block grants to UEs in case they have something to transmit when those resource blocks are not used for actual traffic from other UEs. One possibility for the network is to trigger such pre-allocation of UL resources using downlink packets that are likely to require some acknowledgement from the UE (e.g. a Ping or TCP ACK). More generalized schemes can also be considered.

Note that Pre-allocation is different from other forms of pre-scheduling such as Semi-persistent scheduling. Pre-allocation uses the PDCCH to grant UL resources when not used by actual traffic. On the other hand semi-persistent scheduling provides a regular allocation to the UE without repetitive scheduling on the PDCCH.

Meanwhile, the goal with Contention Based (CB) transmission is to allow uplink synchronized UEs to transmit uplink data without sending Scheduling Request in advance. That would reduce both the latency and the signaling overhead. For small data packets, there could be a tradeoff point where a small packet is more efficiently transmitted on a CB channel, compared to a scheduled one.

A general property of CB channels is that the error rate increases, since data packets may collide with each other. Collisions reduce the maximum throughput of the channel and the throughput becomes sensitive to the offered load. If the offered load is allowed to increase beyond the channel capacity, the collision probability increases rapidly, the system becomes unstable and the throughput decreases. It is therefore of prime importance that CB transmissions do not interfere with Contention Free (CF) uplink transmissions, and that the eNB has effective and fast means of allocating the resources for CB transmission.

One way to achieve the above is to allow CB transmission only in uplink Resource Blocks that have not been reserved for CF uplink transmission. Dynamic assignment of uplink Resource Blocks for CB transmission can be achieved by using the Downlink Physical Control CHannel (PDCCH). By using the PDCCH, CB grants can be assigned to unused resources on a per subframe basis, so that scheduling of uplink CF transmissions is not affected. In this way, a static assignment of CB resources can be avoided, and CB resources can be dynamically assigned, depending on the uplink load.

Contention Based Radio Network Temporary Identifiers (CB-RNTI) are introduced to identify the CB uplink grants on the PDCCH. The CB uplink grants could have the same format as for Rel-8 UEs, i.e. specify Resource Blocks, Modulation and Coding Scheme and Transport Format to be used for the uplink CB transmission. Rel-10 UEs may listen for CB uplink grants addressed to these CB-RNTIs in addition to grants addressed to their dedicated C-RNTI. The available CB-RNTIs in a cell could be either broadcasted or signaled to each UE during RRC connection setup. The scheme is backwards compatible, since pre Rel-10 UEs would not decode the grants addressed to CB-RNTIs.

As a common resource is used, a unique UE identifier is needed in the MAC PDU to identify the UE. The C-RNTI MAC Control Element can be added to each MAC PDU transmitted on a CB uplink resource.

A UE should only be allowed to transmit on CB uplink grants if it does not have a dedicated CF grant. The UE should only be allowed to use CB resources for a limited number of subframes, to improve collision resolution. In parallel to the CB transmission, the UE can also transmit a Scheduling Request to request contention free resources. Note however that in order to maintain the single carrier uplink property, these cannot be transmitted in the same subframe.

The contention based transmission scheme could be as shown in FIG. 6.

Regarding FIG. 6, the eNodeB informs UE of available CB-RNTIs either by broadcast or dedicated signaling (A). The UE receives the CB-RNTIs and starts monitoring PDCCH for available CB grant (B). The eNodeB schedules a CB grant on the PDCCH (C), and the UE detects a CB grant and performs L2 & L1 processing of the data to be transmitted (D). The UE transmits the data on PUSCH using the CB grant (E).

In the proposed form, the CB transmission is supported only for synchronized UEs. In this form, changes to the current specifications are expected to be small and would mainly affect the MAC and RRC specifications. As presented in section 3, there is a perceivable gain in e.g. TCP performance.

Extending the concept to also cover unsynchronized UEs would require substantial changes to the physical layer specifications. For unsynchronized UEs, the transmissions would not fit within the subframe borders, and there would be a need for guard times to avoid overlapping transmissions. Also some form of preamble would be needed to synchronize the eNB receiver. The gain of extending CB transmission scheme to unsynchronized UEs is expected to be small. The gain for synchronized UEs comes from repetitions of the 6 ms difference. For unsynchronized UEs, this would come only once per transaction, as after this the UE would be synchronized. Therefore, we do not consider CB transmissions from unsynchronized UEs to be a worthwhile solution.

Figure 7:
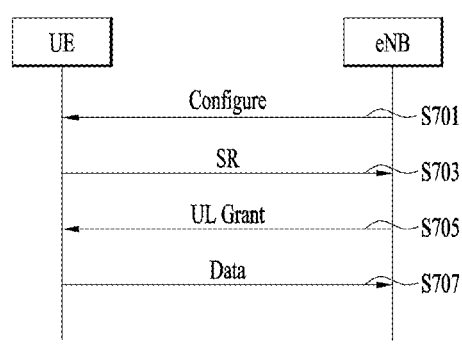
FIG. 7 is an example for a diagram for performing contention based SR procedure.

FIG. 7 is an example for a diagram for performing contention based SR procedure.

In Rel-8, the SR resource and sequence is allocated to a UE via RRC signaling. Of course shorter SR periodicities come at the cost of higher PUCCH resource consumption. The theoretical SR capacity is 18 UEs per PRB, if 180 UEs are supported, the number of PRB equals 180/18=10. If 10

MHz bandwidth is assumed with 1 ms SR period, 20% resource will be used for SR, which is a heavy control channel burden. Hence we propose to consider sharing the SR resource among more than one UE.

FIG. 7 illustrates how SR could be shared. The eNB configures the same SR resource for several UEs through RRC signaling (S701). The UE(s) sends SR to the eNB using the configured SR resource (S703). If there is no collision SR, the eNB allocates a PUSCH grant (S705). The UE transmits the uplink data on the PUSCH (S707).

Two options can be considered to enable sharing SR.

Option 1 is that the UL Grant is addressed to a new SR-RNTI (Shared SR RNTI), configured per group of sharing UEs. Option 2 is that PUCCH Format 1a and/or Format 1b is used for SR. For example, when Format 1a is used, 2 UEs can be identified; with for Format 1b, 4 UEs can be identified. After the eNB receives the SR using format 1a and/or 1b, it can allocate a regular UL grant to the identified UE.

We now discuss the handling when more than one UE uses the same PUCCH-SR resource in a TTI (collision).

For option 1, the eNB may not be able to tell when a PUCCH-SR collision happens; it grants resources for UL transmission and more than one UE uses it. The PUSCH transmission will fail. The eNB could in this case provide grants to the C-RNTIs of each UE sharing that resource or do nothing. The UE may send SR again if no UL grant is received after sending SR, but needs to apply some (random or UE specific) delay, to avoid continued collision with another UE that would have sent an SR at the same time. The efficiency of such solution depends on the collision probability and degree of robustness of the selected MCS in UL grant: (i.e. if the MCS is quite robust, a first non-colliding transmission is often decoded successfully, so a failed transmission could be assumed caused by a collision.).

For option 2, SR collisions likely results in DTX detection at eNB, so no uplink grant is given. The UE behavior can be similar as for option 1. It could be further studied if the eNB can differentiate between receiving a collision or receiving high interference. If the eNB can differentiate, it could allocate UL resource for all the UEs sharing the collided resource separately, which helps to reduce the access delay caused by backoff after collision.

Based on above analysis, it seems option 2 provides simpler and more resource efficient SR collision processing mechanism than option 1. In addition, no new SR-RNTI is needed in option 2.

Both options are inefficient in case PUCCH-SR collision occurs, but again, if SR period is short and few UEs share it, the collision probability remains low.

The sharing PUCCH-SR procedure is compared with CB-PUSCH and we conclude that CB-PUSCH provides best delay performance when the eNB has unused PUSCH resource. When the network is loaded, sharing SR is preferred.

Figure 8:
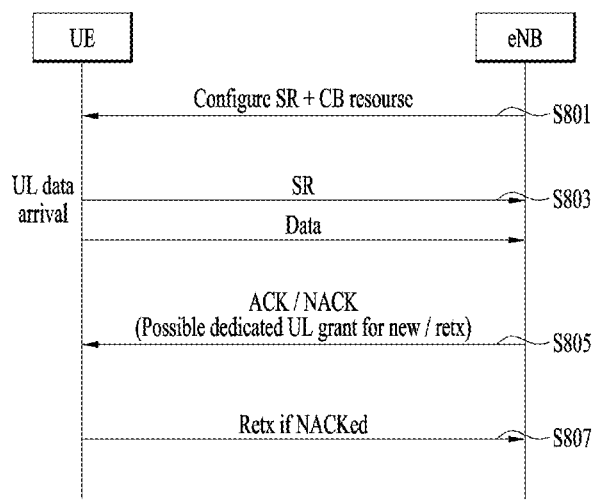
FIG. 8 is an example for a diagram for performing contention based transmission.

FIG. 8 is an example for a diagram for performing contention based transmission.

There might be 3 ms difference between contention based transmission and 1 ms SR period with the assumption of contention based resource is available every TTI, because UE does not need to transmit the dedicated-SR (D-SR) and wait for eNB to response. The same performance could be achieved with dedicated pre-allocation, but it would be very costly to allocate dedicated resources for every UE in every TTI. SR associated contention based transmission offers an interesting compromise, in which the pre-allocated resource is shared and identification of the UEs making use of it is done via the D-SR. The basic procedure of SR associated contention based transmission is shown in FIG. 8.

The eNB configures the UE with D-SR and shared resource (S801). Upon UL data arrival, UE sends SR and the TB on the shared resource "simultaneously" without waiting for dedicated UL grant (S803). The eNB can identify the UEs using the contention based resource based on the received SR. When eNB receives more than one SR linked to same resource, which means collision happens, ACK the TB no matter it is correctly decoded or not and give dedicated grant to each UE sent the SR, i.e. fall back to R8/9; (The ACKed TB would rely on RLC retransmission for collision case). When the eNB only receives one SR linked to the same resource, no collision, NACK if the TB is not correctly decoded, ACK otherwise. Thus from UE perspective, normal R8/9 HARQ is still applicable (S805).

Adaptive retransmission with different resource is possible as UE is identified with the SR which will reduce the load on the contention based resource (S807).

Meanwhile, resource usage efficiency was one of the main concerns raised on contention based transmission on PUSCH because very conservative MCS needs to be used to guarantee the coverage. A contention based resource for a TB of the mostly mentioned typical TCP ACK use case, taking into account RLC header (at least 1~2 bytes)+MAC header with one more byte to be added for UE identity and possible BSR (2~4 bytes), would need 3~4 PRBs (16 bits TBS for one PRB with most conservative MCS); while if dedicated grant with proper MCS (at most 712 bits TBS for one PRB), much less resource is needed to accommodate the TB. If several contention based resources are to be reserved to reduce collision probability, the capacity for dedicated grant would be significantly impacted, which makes the 3 ms latency reduction optimization a rather expensive one.

Furthermore, normal HARQ operation probably cannot work because retransmission from UE upon receiving NACK does not help or even makes the situation worse if the decoding failure is because of collision, and it is difficult (if not impossible) for the eNB to make soft combining of the TB transmitted on the contention based resource; while ACK cannot be interpreted as ACK because it could be an ACK for other UEs. No HARQ makes resource efficiency worse as even more conservative MCS would be required to ensure the TB can be decoded within only one transmission for cell edge UE.

Figure 9:
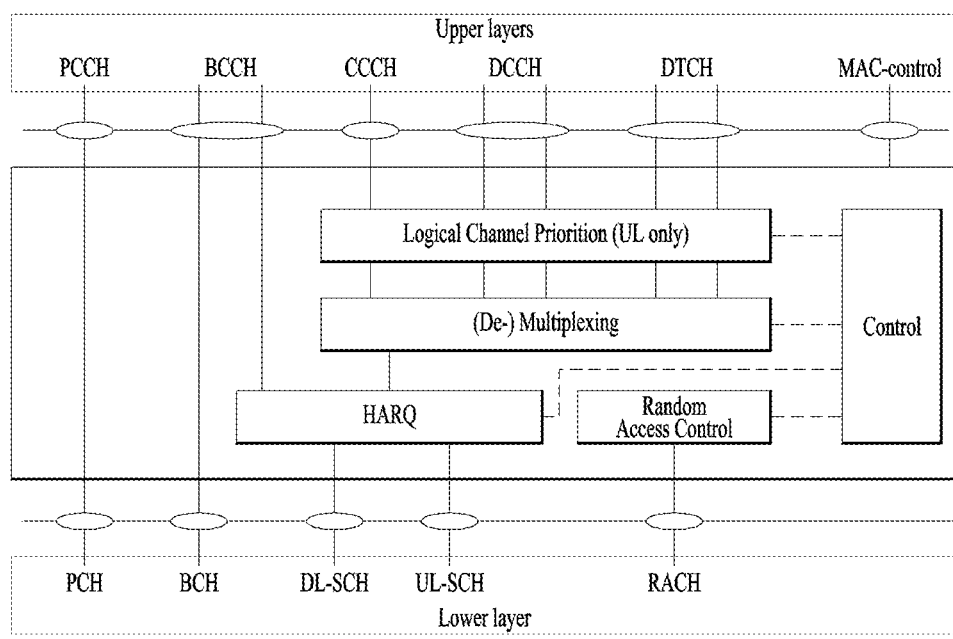
FIG. 9 is a diagram for MAC structure overview in a UE side.

FIG. 9 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical channel types specified for LTE includes Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), Multicast Traffic Channel (MTCH).

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

When uplink data becomes available for transmission in the UE side but has no uplink grant, the UE will trigger SR due to triggered BSR and transmit BSR/uplink data when the UE gets uplink grant from the eNB. This ensures that only one UE uses the provided uplink grant at the cost of latency which is brought up by the sequential procedure of getting uplink grant from the eNB.

In Rel-13, in order to reduce latency in uplink data transmission, contention based PUSCH transmission has been considered in 3GPP.

Figure 10:
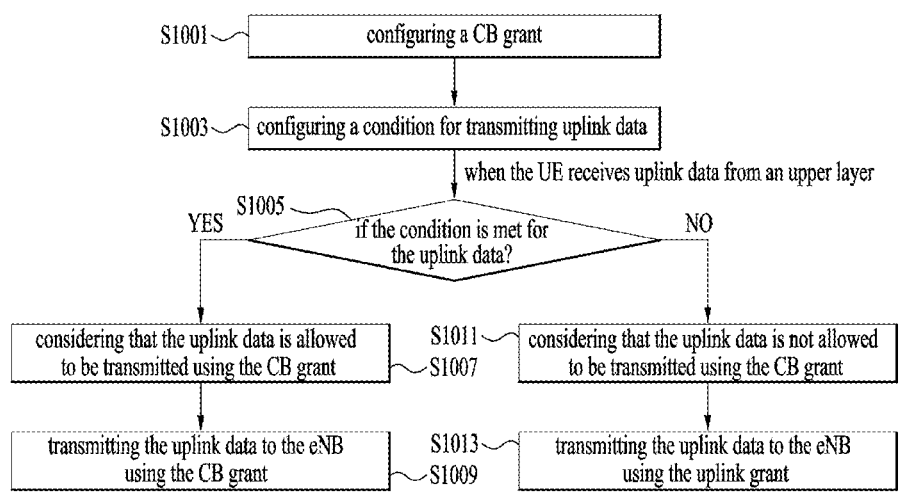
FIGS. 10 and 11 are conceptual diagrams for transmitting a contention-based PUSCH in a wireless communication system according to embodiments of the present invention.

The contention based PUSCH transmission allows UE to transmit uplink data by using the pre-configured uplink grants which can be allocated to multiple UEs. This of course allows the UE to transmit uplink data as soon as the uplink data becomes available for transmission. However, it seems inevitable that data transmission would fail when contention occurs. As contention may cause additional delay, the UE can benefit from contention based PUSCH transmission opportunistically at the cost of potential additional delay due to contention. Therefore, it is important not to allow contention based PUSCH transmission depending on the prohibit condition FIG. 10 is a conceptual diagram for transmitting a contention-based PUSCH in a wireless communication system according to embodiments of the present invention.

The invention is that when there is data available for transmission for a logical channel, the UE can transmit the data of the logical channel on a CB-PUSCH resource if a condition is met. If the condition is not met, the UE transmits the data of the logical channel only on the uplink grant even though there is the CB-PUSCH.

When the eNB transmits a CB grant to the UE, the UE is configured with a CB-PUSCH resource (S1001).

The CB grant means a grant configured to the UE with an opportunity to send UL packets without requiring the UE to send a scheduling request. The CB grant is a time-frequency resource on which at least two UEs are allowed to transmit a MAC PDU to the eNB. That is, Multiple UEs can be configured with the same CB grant, i.e., the eNB can configure multiple UEs with the same CB grant.

Preferably, the CB grant is used only for synchronized UEs in order to transmit uplink data without sending Scheduling Request in advance.

Preferably, the CB grant correspond to uplink resources only that have not been reserved for dedicated uplink transmission (i.e., the dedicated uplink transmission is performed using conventional uplink grant) so that transmissions based on the CB grant do not interfere with dedicated uplink transmission.

The UE is configured with a condition called as an "allowing condition" for transmitting data using the CB grant called as "CB-PUSCH" (S1003).

Preferably, the condition indicates a data can be transmitted using the CB grant.

The UE knows the condition of transmitting a data using the CB grant, where the condition is either configured by the network via Layer-2 signal or pre-defined in the specification.

The condition can be defined as follows: i) the data of a specific bearer/logical channel; or ii) the data of a specific group of logical channels, e.g., LCG; or iii) the data using a specific RLC mode, e.g., AM RLC; or iv) the amount of data of a bearer/logical channel is smaller than a threshold; or v) the amount of data of a group of logical channels is smaller than a threshold; or vi) the amount of data of the UE is smaller than a threshold; or v) any combination of above conditions.

When the UE receives uplink data from an upper layer, the UE checks whether the condition is met for the uplink data (S1005).

If the condition is met, the UE considers that the uplink data is allowed to be transmitted using the CB grant (S1007).

For the logical channel which satisfies the condition, the UE considers that the data of the logical channel is allowed to be transmitted using the CB-PUSCH resource. I.e., the UE transmits the data of the logical channel which satisfies the condition by using either the CB-PUSCH resource or the uplink grant.

For the group of logical channels which satisfies the condition, the UE considers that the data of the logical channels which belong to the group of logical channels is allowed to be transmitted on the CB-PUSCH resource. I.e., the UE transmits the data of the group of the logical channels which satisfies the condition by using either the CB-PUSCH resource or the uplink grant.

For any logical channel configured for the UE, the UE considers that the data is allowed to be transmitted on the CB-PUSCH resource. I.e., the UE transmits the data of any logical channel by using either the CB-PUSCH resource or the uplink grant.

When the UE generates a MAC PDU to be transmitted on the CB-PUSCH resource, the UE includes only the MAC SDUs from the logical channel that satisfies the condition and does not include the MAC SDUs from the logical channel that doesn't satisfy the condition. The UE transmits the MAC PDU to the eNB using the CB grant (S1009).

Else, if the condition is not met, the UE considers that the uplink data is not allowed to be transmitted on the CB-PUSCH resource (S1011). In this case, the UE should transmit the uplink data using only a uplink grant.

For the logical channel which does not satisfy the condition, the UE considers that the data of the logical channel is not allowed to be transmitted on the CB-PUSCH resource. I.e., the UE transmits the data of the logical channel which satisfies the condition by using only the uplink grant.

For the group of logical channel which does not satisfy the condition, the UE considers that the data of the logical channels which belong to the group of logical channels is not allowed to be transmitted on the CB-PUSCH resource. I.e., the UE transmits the data of the group of the logical channels which satisfies the condition by using only the uplink grant.

For any logical channel configured for the UE, the UE considers that the data is not allowed to be transmitted on the CB-PUSCH resource. I.e., the UE transmits the data of any logical channel by using only the uplink grant.

If the condition is not met, in order for the UE to transmit the data by using the uplink grant, the UE performs Buffer Status Reporting, Scheduling Request, and Random Access procedures. When performing the buffer status report, the UE reports the buffer status by considering the data of all logical channels regardless of whether the condition is met or not.

When the UE generates a MAC PDU to be transmitted on the uplink grant, the UE includes the MAC SDUs from any logical channel configured for the UE. The UE transmits the MAC PDU using the uplink grant to the eNB (S1013).

Preferably, if the condition is not met for a certain time period, the UE considers that the data is not allowed to be transmitted on the CB-PUSCH resource and transmit the data by using only the uplink grant.

Preferably, the certain time period is configured by the network or defined in the specification. And the certain time period is, for example, a time duration or the number of transmission failure on the CB-PUSCH resource.

Figure 11:
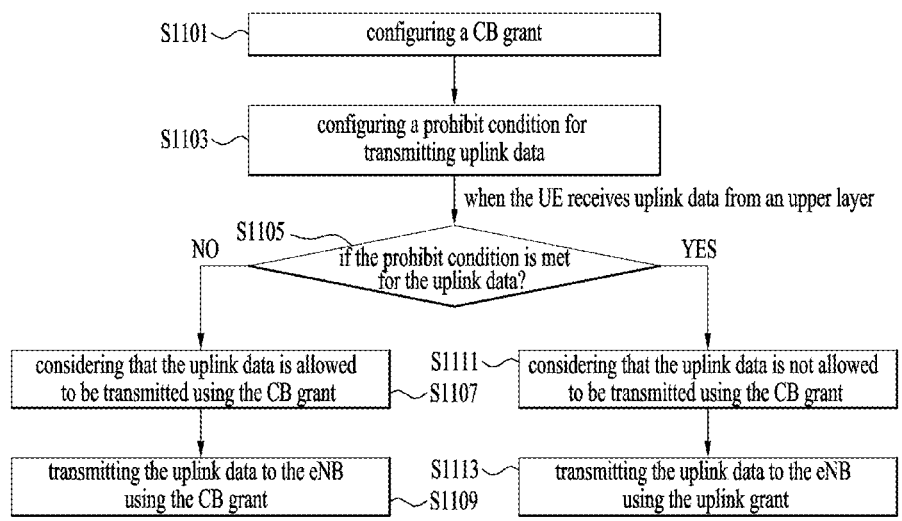

FIG. 11 is a conceptual diagram for transmitting a contention-based PUSCH in a wireless communication system according to embodiments of the present invention.

The invention is that when there is data available for transmission for a logical channel, the UE can transmit the data of the logical channel on either CB-PUSCH resource or uplink grant if a prohibit condition is not met. If the prohibit condition is met, the UE transmits the data of the logical channel only on the uplink grant even though there is the CB-PUSCH resource.

When the eNB transmits a CB grant to the UE, the UE is configured with a CB-PUSCH resource (S1101).

The CB grant means a grant configured to the UE with an opportunity to send UL packets without requiring the UE to send a scheduling request. The CB grant is a time-frequency resource on which at least two UEs are allowed to transmit a MAC PDU to the eNB. That is, Multiple UEs can be configured with the same CB grant, i.e., the eNB can configure multiple UEs with the same CB grant.

Preferably, the CB grant is used only for synchronized UEs in order to transmit uplink data without sending Scheduling Request in advance.

Preferably, the CB grant correspond to uplink resources only that have not been reserved for dedicated uplink transmission (i.e., the dedicated uplink transmission is performed using conventional uplink grant) so that transmissions based on the CB grant do not interfere with dedicated uplink transmission.

The UE is configured with a condition called as an "prohibit condition" for prohibition of transmitting data using a CB-grant called as "CB-PUSCH" (S1103).

Preferably, the prohibit condition indicating that a data cannot be transmitted using the CB grant.

The UE knows a prohibit condition of transmitting a data on CB-PUSCH resource, where the prohibit condition is either configured by the network via Layer-2 signal or pre-defined in the specification.

The prohibit condition can be defined as follows: i) the data of a specific bearer/logical channel; or ii) the data of a specific group of logical channels, e.g., LCG; or iii) the data using a specific RLC mode, e.g., AM RLC; or iv) the amount of data of a bearer/logical channel is larger than a threshold; or v) the amount of data of a group of logical channels is larger than a threshold; or vi) the amount of data of the UE is larger than a threshold; or vii) triggering of scheduling request is prohibited by e.g., logicalChannelSR-Prohibit-Timer, sr-ProhibitTimer, logicalChannelSR-Mask, or measurement gap; or viii) any combination of above prohibit conditions.

When the UE receives uplink data from an upper layer, the UE checks whether the prohibit condition is met for the uplink data (S1105).

If the prohibit condition is not met, the UE considers that the uplink data is allowed to be transmitted using the CB grant (S1107).

For the logical channel which doesn't satisfy the prohibit condition, the UE considers that the data of the logical channel is allowed to be transmitted on the CB-PUSCH resource. I.e., the UE transmits the data of the logical channel which doesn't satisfy the prohibit condition by using either the CB-PUSCH or the uplink grant.

For the group of logical channels which doesn't satisfy the prohibit condition, the UE considers that the data of the logical channels which belong to the group of logical channels is allowed to be transmitted on the CB-PUSCH resource. I.e., the UE transmits the data of the group of the logical channels which doesn't satisfy the prohibit condition by using either the CB-PUSCH or the uplink grant.

For any logical channel configured for the UE, the UE considers that the data is allowed to be transmitted on the CB-PUSCH resource. I.e., the UE transmits the data of any logical channel by using either the CB-PUSCH resource or the uplink grant.

When the UE generates a MAC PDU to be transmitted on the CB-PUSCH resource, the UE includes only the MAC SDUs from the logical channel that does not satisfies the prohibit condition and does not include the MAC SDUs from the logical channel that satisfies the prohibit condition. The UE transmits the MAC PDU to the eNB using the CB grant (S1109).

Else, if the prohibit condition is met, the UE considers that the uplink data is not allowed to be transmitted on the CB-PUSCH resource (S1111). In this case, the UE should transmit the uplink data using only the uplink grant.

For the logical channel which satisfies the prohibit condition, the UE considers that the data of the logical channel is not allowed to be transmitted on the CB-PUSCH resource. I.e., the UE transmits the data of the logical channel which satisfies the prohibit condition by using only the uplink grant.

For the group of logical channel which satisfies the prohibit condition, the UE considers that the data of the logical channels which belong to the group of logical channels is not allowed to be transmitted on the CB-PUSCH resource. I.e., the UE transmits the data of the group of the logical channels which satisfies the prohibit condition by using only the uplink grant.

For any logical channel configured for the UE, the UE considers that the data is not allowed to be transmitted on the CB-PUSCH resource. I.e., the UE transmits the data of any logical channel by using only the uplink grant.

If the prohibit condition is met, in order for the UE to transmit the data by using the uplink grant, the UE performs Buffer Status Reporting, Scheduling Request, and Random Access procedures. When performing the buffer status report, the UE reports the buffer status by considering the data of all logical channels regardless of whether the condition is met or not.

When the UE generates a MAC PDU to be transmitted on the uplink grant, the UE includes the MAC SDUs from any logical channel configured for the UE. The UE transmits the MAC PDU using the uplink grant to the eNB (S1113).

Preferably, if the prohibit condition is met for a certain time period, the UE considers that the data is not allowed to be transmitted on the CB-PUSCH resource and transmit the data by using only the uplink grant.

Preferably, the certain time period is configured by the network or defined in the specification. And the certain time period is, for example, a time duration or the number of transmission failure on the CB-PUSCH resource.

Figure 12:
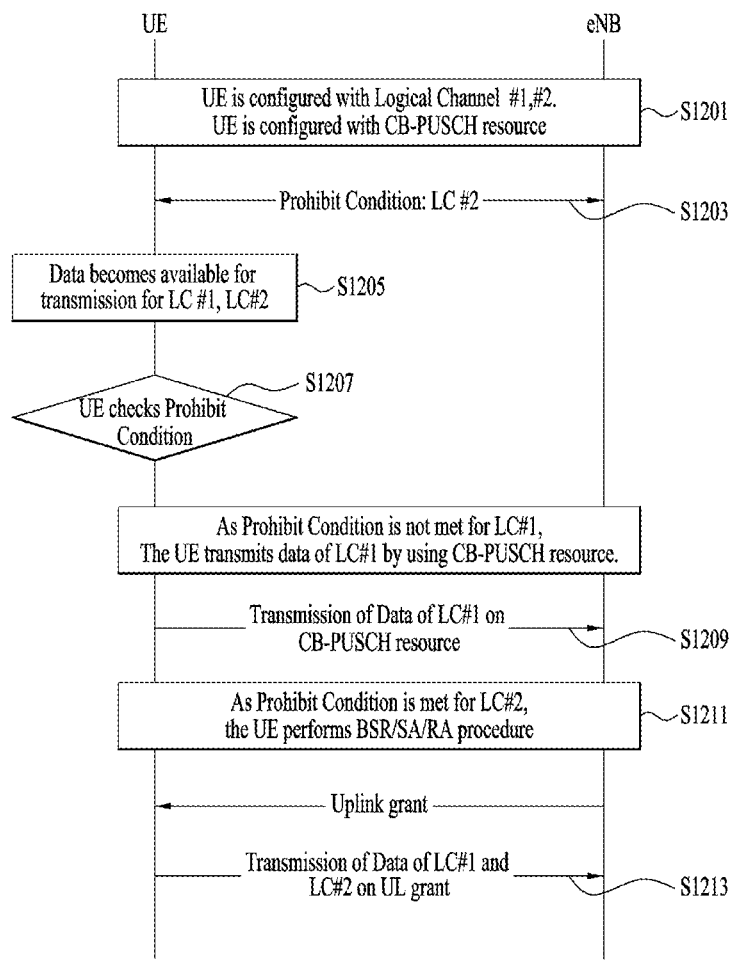
FIG. 12 is an example for transmitting a contention-based PUSCH in a wireless communication system according to embodiments of the present invention.

FIG. 12 is an example for transmitting a contention-based PUSCH in a wireless communication system according to embodiments of the present invention.

A UE is configured with Logical Channel #1 and #2, and the UE is configured with CB-PUSCH resource (S1201).

When the UE receives a prohibit condition from the network that the data of LC #2 is not allowed to be transmitted on the CB-PUSCH resource, the UE is configured with the prohibit condition (S1203).

When the data of LC #1 and LC #2 becomes available for transmission (S1205), the UE checks whether Prohibit Condition is met for the data or not (S1207).

Prohibit Condition is not met for the data of LC #1. Accordingly, the UE transmits the data of LC #1 by using the CB-PUSCH resource configured for the UE (S1209).

Prohibit Condition is met for the data of LC #2. Accordingly, the UE performs the BSR/SR/RA procedures and gets uplink grant as a result (S1211). Using the received uplink grant, the UE transmits the data of LC #2 and if remains, LC #1 (S1213).

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a User Equipment (UE) operating in a wireless communication system, the method comprising:
configuring a contention based (CB) grant;
configuring a prohibit condition indicating that data cannot be transmitted using the configured CB grant;
receiving uplink (UL) data from an upper layer;
determining whether the configured prohibit condition is met for the received UL data; and
transmitting the received UL data using the CB grant if the prohibit condition is not met, wherein data indicated by the prohibit condition corresponds to a specific Radio Link Control (RLC) mode.

2. The method according to claim 1, further comprising transmitting the received UL data using an UL grant if the configured prohibit condition is met.

3. The method according to claim 2, wherein transmitting the received UL data using the UL grant comprises performing Buffer Status Reporting, Scheduling Request, and Random Access procedures.

4. The method according to claim 3, wherein performing the Buffer Status Reporting comprises reporting buffer status by considering data of all logical channels regardless of whether the configured prohibit condition is met.

5. The method according to claim 2, further comprising generating a Medium Access Control (MAC) Protocol Data Unit (PDU) for transmission using the UL grant, the generated MAC PDU including MAC Service Data Units (SDUs) from a logical channel configured for the UE.

6. The method according to claim 1, further comprising generating a Medium Access Control (MAC) Protocol Data Unit (PDU) for transmission using the generated configured CB grant, the MAC PDU including MAC Service Data Units (SDUs) from a logical channel that does not satisfy the configured prohibit condition and not including MAC SDUs from a logical channel that satisfies the configured prohibit condition.

7. The method according to claim 1, wherein the configured prohibit condition is valid for a certain time period.

8. A method for a User Equipment (UE) operating in a wireless communication system, the method comprising:
configuring a contention based (CB) grant;
configuring a condition indicating that data can be transmitted using the configured CB grant;
receiving uplink (UL) data from an upper layer;
determining whether the configured condition is met for the received UL data; and
transmitting the received UL data using the CB grant if the condition is met,
wherein data indicated by the configured condition corresponds to a specific Radio Link Control (RLC) mode.

9. The method according to claim 8, further comprising transmitting the received UL data using an UL grant if the condition is not met.

10. The method according to claim 8, wherein the configured prohibit condition is valid for a certain time period.

11. A User Equipment (UE) operating in a wireless communication system, the UE comprising:

a Radio Frequency (RF) module configured to transmit and receive signals; and
a processor operably coupled with the RF module and configured to:
configure a contention based (CB) grant;
configure a prohibit condition indicating that data cannot be transmitted using the configured CB grant;
control the RF module to receive uplink (UL) data from an upper layer;
determine whether the configured prohibit condition is met for the received UL data; and
control the RF module to transmit the received UL data using the configured CB grant if the configured prohibit condition is not met,
wherein data indicated by the configured prohibit condition corresponds to a specific Radio Link Control (RLC) mode.

12. The UE according to claim 11, wherein the processor is further configured to control the RF module to transmit the received UL data using an UL grant if the prohibit condition is met.

13. The UE according to claim 12, wherein the processor is further configured to generate a Medium Access Control (MAC) Protocol Data Unit (PDU) for transmission using the UL grant, the generated MAC PDU including MAC Service Data Units (SDUs) from a logical channel configured for the UE.

14. The UE according to claim 12, wherein transmitting the received UL data using the UL grant comprises performing Buffer Status Reporting, Scheduling Request, and Random Access procedures.

15. The UE according to claim 14, wherein performing the Buffer Status Reporting comprises reporting buffer status by considering data of all logical channels regardless of whether the configured prohibit condition is met.

16. The UE according to claim 11, wherein the processor is further configured to generate a Medium Access Control (MAC) Protocol Data Unit (PDU) for transmission using the configured CB grant, the generated MAC PDU including MAC Service Data Units (SDUs) from a logical channel that does not satisfy the configured prohibit condition and not including MAC SDUs from a logical channel that satisfies the configured prohibit condition.

17. The UE according to claim 11, wherein the configured prohibit condition is valid for a certain time period.

* * * * *